United States Patent [19]

Stockwell et al.

[11] Patent Number: 6,144,934
[45] Date of Patent: Nov. 7, 2000

[54] BINARY FILTER USING PATTERN RECOGNITION

[75] Inventors: Edward B. Stockwell, St. Paul, Minn.; William E. Boebert, Albuquerque, N. Mex.; Heidi A. Vanyo, Coon Rapids, Minn.

[73] Assignee: Secure Computing Corporation, Roseville, Minn.

[21] Appl. No.: 08/715,333

[22] Filed: Sep. 18, 1996

[51] Int. Cl.[7] .............................. G06F 17/20; G06F 17/27
[52] U.S. Cl. ..................................................... 704/1; 704/9
[58] Field of Search .................................... 704/1, 3, 9, 8; 395/575, 600, 650, 200.01; 707/500, 513; 382/185

[56] References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner | 364/200 |
| 4,701,840 | 10/1987 | Boebert et al. | 364/200 |
| 4,713,753 | 12/1987 | Boebert et al. | 380/4 |
| 4,870,571 | 9/1989 | Frink | 364/200 |
| 4,885,789 | 12/1989 | Burger et al. | 380/25 |
| 4,914,568 | 4/1990 | Kodosky et al. | 364/200 |
| 4,914,590 | 4/1990 | Loatman et al. | 364/419 |
| 5,251,131 | 10/1993 | Massand et al. | 704/9 |
| 5,272,754 | 12/1993 | Boebert | 380/25 |
| 5,276,735 | 1/1994 | Boebert et al. | 380/21 |
| 5,276,789 | 1/1994 | Besaw et al. | 395/140 |
| 5,303,303 | 4/1994 | White | 380/49 |
| 5,333,266 | 7/1994 | Boaz et al. | 395/200 |
| 5,355,474 | 10/1994 | Thuraisngham et al. | 395/600 |
| 5,377,349 | 12/1994 | Motomura | 395/600 |
| 5,377,354 | 12/1994 | Scannell et al. | 395/650 |
| 5,414,833 | 5/1995 | Hershey et al. | 395/575 |
| 5,418,951 | 5/1995 | Damashek | 395/600 |
| 5,530,758 | 6/1996 | Marino, Jr. et al. | 380/49 |
| 5,548,507 | 8/1996 | Martino et al. | 704/9 |
| 5,555,346 | 9/1996 | Gross et al. | 395/51 |
| 5,606,668 | 2/1997 | Shwed | 395/200.11 |
| 5,619,648 | 4/1997 | Canale et al. | 395/200.01 |
| 5,632,011 | 5/1997 | Landfield et al. | 395/326 |
| 5,634,084 | 5/1997 | Malsheen et al. | 704/260 |
| 5,644,571 | 7/1997 | Seaman | 370/401 |
| 5,673,322 | 9/1997 | Pepe et al. | 380/49 |
| 5,689,566 | 11/1997 | Nguyen | 380/25 |
| 5,715,466 | 2/1998 | Flanagan et al. | 704/8 |
| 5,717,913 | 2/1998 | Driscoll | 395/605 |
| 5,720,035 | 2/1998 | Allegre et al. | 395/200.06 |
| 5,781,550 | 7/1998 | Templin et al. | 370/401 |

FOREIGN PATENT DOCUMENTS 0 743 777 A2  11/1996  European Pat. Off. ........ H04L 29/06

OTHER PUBLICATIONS

Boebert, W.E., et al., "Secure Ada Target: Issues, System Design, and Verification", Proceedings of the Symposium on Security and Privacy, Oakland, California, pp. 59–66, (1985).

Boebert, W.E., et al., "Secure Computing: The Secure Ada Target Approach", *Sci. Honeyweller*, 6 (2), 17 pages, (Apr. 1985).

Smith, R.E., "Constructing a High Assurance Mail Guard", Proceedings of the 17th National Computer Security Conference, p. 247–253 (Oct. 1994).

(List continued on next page.)

*Primary Examiner*—Vivian Chang
*Assistant Examiner*—Patrick N. Edouard
*Attorney, Agent, or Firm*—Schwegman, Lundberg Woessner & Kluth, P.A.

[57] ABSTRACT

An electronic message filtering system and method is described. A message is received as input to the filter and decomposed into a set of components. The set of components is then processed through a pattern matching algorithm to determine if the message contents contains patterns inherent in a specified pattern, such as a natural language. The results of the pattern match analysis are output by the filter.

25 Claims, 7 Drawing Sheets

OTHER PUBLICATIONS

Gassman, B., "Internet Security, and Firewalls Protection on the Internet", *IEEE*, 93–107 (1996).

Greenwald, M., et al., "Designing an Academic Firewall: Policy, Practice, and Experience with SURF", *IEEE*, 79–92 (1996).

Karn, P., et al., "The ESP DES–CBC Transform", Network Working Group, Request for Comment No. 1829, http//ds.internic.net/rfc/rfc1829.txt, 9 p. (Aug. 1995).

Lampson, B.W., et al., "Dynamic Protection Structures", AFIPS Conference Proceedings, 35, 1969 Fall Joint Computer Conference, Las Vegas, NV, 27–38 (Nov. 18–20, 1969).

Merenbloom, P., "Network 'Fire Walls' Safeguard LAN Data from Outside Intrusion", *Infoworld*, p. 69 & addnl page (Jul. 25, 1994).

Metzger, P., et al., "IP Authentication using Keyed MD5", Network Working Group, Request for Comments. No. 1828, http//ds.internic.net/rfc/rfc1828.txt, 5 p. (Aug. 1995).

Peterson, L.L., et al., *In: Computer Networks*, Morgan Kaufmann Publishers, Inc., San Francisco, CA, p. 218–221, 284–286 (1996).

Press, L., "The Net: Progress and Opportunity", *Communications of the ACM*, 35, 21–25 (Dec. 1992).

Stempel, S., "IpAccess—An Internet Service Access System for Firewall Installations", *IEEE*, 31–41 (1995).

White, L.J., et al., "A Firewall Concept for Both Control–Flow and Data–Flow in regression Integration Testing", *IEEE*, 262–271 (1992).

Wolfe, A., "Honeywell Builds Hardware for Computer Security", *Electronics*, 14–15 (Sep. 2, 1985).

"Answers to Frequently Asked Questions About Network Security", Secure Computing Corporation, 41 p. (1994).

Adam, J.A., "Meta–matrices", *IEEE Spectrum*, 26–27 (Oct. 1992).

Adam, J.A., "Playing on the Net", *IEEE Spectrum*, 29 (Oct. 1992).

Ancilotti, P., et al., "Language Features for Access Control", *IEEE Transactions on Software Engineering, SE–9*, 16–25 (Jan. 1983).

Baclace, P.E., "Competitive Agents for Information Filtering", *Communications of the ACM*, 35, 50 (Dec. 1992).

Belkin, N.J., et al., "Information Filtering and Information Retrieval: Two Sides of the Same Coin?", *Communications of the ACM*, 35, 29–38 (Dec. 1992).

Bellovin, S.M. et al., "Network Firewalls", *IEEE Communications Magazine*, 32, 50–57 (Sep. 1994).

Bevier, W.R., et al., "Connection Policies and Controlled Interference", Proceedings of the 8th IEEE Computer Security Foundations Workshop, Kenmare, County Kerry, Ireland, 167–176 (Jun. 13–15, 1995).

Bryan, J., "Firewalls For Sale", *BYTE*, p. 99–100, 102 and 104 (Apr. 1995).

Damashek, M., "Gauging Similarity with n–Grams: Language—Independent Categorization of Text", *Science*, 267, 843–848 (Feb. 10, 1995).

Foltz, P.W., et al., "Personalized Information Delivery: An Analysis of Information Filtering Methods", *Communications of the ACM*, 35, 51–60 (Dec. 1992).

Goldberg, D., et al., "Using Collaborative Filtering to Weave an Information Tapestry", *Communications of the ACM*, 35, 61–70 (Dec. 1992).

Grampp, F.T., "UNIX Operating System Security", *AT &T Bell Laboratories Technical Journal*, 63, 1649–1672 (Oct. 1984).

Haigh, J.T., et al., "Extending the Non–Interference Version of MLS for SAT" Proceedings of the 1986 IEEE Symposium on Security and Privacy, Oakland, CA, 232–239 (Apr. 7–9, 1986).

Kent, S.T., "Internet Privacy Enhanced Mail", *Communications of the ACM*, 36, 48–60 (Apr. 1993).

Lee, K.–C., et al., "A Framework for Controlling Cooperative Agents", *Computer*, 8–16 (Jul. 1993).

Loeb, S., "Architecting Personalized Delivery of Multimedia Information", *Communications of the ACM*, 35, 39–50 (Dec. 1992).

Loeb, S., et al., "Information Filtering," *Communications of the ACM*, 35, 26–28 (Dec. 1992).

Smith, R.E., "Sidewinder: Defense in Depth Using Type Enforcement", *International Journal of Network Management*, 219–229 (Jul.–Aug. 1995).

Stadnyk I., et al., "Modelling Users' Interests in Information Filters", *Communications of the ACM*, 35, 49 (Dec. 1992).

Stevens, C., "Automating the Creation of Information Filters", *Communications of the ACM*, 35, 48 (Dec. 1992).

Thomsen, D., "Type Enforcement: The New Security Model", Proceedings of the SPIE, Multimedia: Full–Service Impact on Business, Education and the Home, vol. 2617, Philadelphia, Pa, 143–150 (Oct. 23–24, 1995).

Warrier, U.S., et al., "A Platform for Heterogeneous Interconnection Network Management", *IEEE Journal on Selected Areas in Communications*, 8, 119–126, (Jan. 1990).

CONFIGURATION FILE PROGRAM LISTING

```
################################################################

#       File: /etc/.....

#       Description: This file describes the binary filter's configuration.

#       What is configured:

#               Accuracy

``` begin_rules

```
#       The following is a description of the filtering rule. This is the rule that
#       defines the runtime behavior of the binary filter. The configuration
#       consists of the following items:
#       Accuracy:
#       This would be a number to allow the user to adjust the range in which
#       messages are considered text.
#       A number between 0.25 and 1.00.

``` filtering(id Accuracy)

\#      This is the end of the description of the filtering rule.

end_rules.

filtering(binary 0.5)

$$\phi_p - A * \phi_p \qquad \phi_p \qquad \phi_p + A * \phi_p$$

with labels 920, 910, 930 pointing to the three expressions respectively.

BINARY FILTER USING PATTERN RECOGNITION

BACKGROUND OF THE INVENTION

1. Field of the Invention

The present invention relates to computer security, and more particularly, to an apparatus and method for filtering electronic messages according to characteristics of their content.

2. Background Information

The use of computerized communications is increasingly common at all levels of society. In order for a person or business to be completely connected they have to be able to send and receive electronic mail. In addition, electronic transfer of information is fast outstripping other means. Along with accessability, however, comes exposure. The ability to send or receive mail, for example, from or to anyplace in the world also provides the ability for unscrupulous parties to send out private information or send in unwanted data or executables.

What is needed in such an environment is a way to filter incoming and outgoing messages. This information can be used to simply monitor the traffic on the system, or it may be used in conjunction with restrictive features of the system to prevent transmission or acceptance of certain types of messages. For example, such a filter could be used to prevent any normal text (natural language as opposed to program or data files that happen to be textual in nature) messages from going outside the company. This enforces a policy that all outgoing mail must be encoded. As another example, only normal text messages are allowed in to a mail system. This would prevent delivery of messages such as binary files which may contain viruses. Where the only communications the system expects should contain primarily natural language (such as an electronic mail system) the need is to be able to recognize and accept any natural language file and reject all others.

Conventional systems employ a variety of affimative filters. This type of filter is designed to recognize one particular file type. For example, filters have been written to detect PGP and MIME encrypted packets. By definition such a filter will not detect any other file type, and a site must activate a separate filter for every file type they are interested in catching. A company thus embodies its security policy in the set of filters activated on their electronic messaging systems. A system employing this conglomeration of filters is limited in several ways. Currently, a large quantity of file formats exist, and new ones are added regularly. When a new type is added, a system employing an array of conventional filters will fail to detect the new file type until a new filter is constructed to recognize it. In addition, a system filtering for more than one file type experiences increases in costly overhead by having to process every message through a growing chain of multiple single-purpose filters. What is needed is a generalized filter which is not bound by a particular file type.

SUMMARY OF THE INVENTION

The primary object of the present invention is to eliminate the aforementioned drawbacks of the prior art.

Another object of the present invention is to provide a generalized binary filter system and method which can distinguish between normal text (natural language) and non-text (files of any type not containing natural language) messages. It is referred to as a 'binary' filter as a generalization of the concept that an electronic message which is not normal text is some form of binary (program code, images, data, encrypted messages, etc.). The filter of the present invention is comprehensive, able to evaluate a wide variety of files types with a single algorithm. Such a filter is also more likely than conventional filters to catch instances of brand-new file types. In addition, such a generalized binary filter is harder to break than the conventional format-specific type. A format-specific filter can be assumed to be following the rules of the format, and thus someone can slip through the filter by imitating allowed format types in the message. The rules applied by the binary filter are based on patterns inherent in the content of the messages and are thus much more difficult to imitate. No filtering technique is 100% effective, but incorporating a pattern-matching technique raises the threshold much higher than conventional systems.

One embodiment of the present invention provides a method of filtering an electronic message, comprising the steps of decomposing the message into a set of components and applying pattern recognition logic to the set of components to determine if each component falls within the parameters expected in a particular format, such as a natural language. In one implementation the filter is interfaced with an electronic mail structure in order to filter the messages passing through the mail structure.

According to yet another embodiment of the present invention, a computer program product is provided, comprising a computer usable medium having a computer readable code means embodied therein for causing electronic messages to be analyzed as to whether the contents of each electronic message comprises a natural language. The computer readable program code means in said computer program product comprises computer readable program code means for causing a computer to read a first electronic message, computer readable program code means for causing a computer to decompose the first electronic message into components, and computer readable program code means for causing a computer to perform a pattern analysis of the components to identify whether the first electronic message comprises a natural language.

DETAILED DESCRIPTION OF THE PREFERRED EMBODIMENTS

In the following Detailed Description of the Preferred Embodiments, reference is made to the accompanying Drawings which form a part hereof, and in which are shown by way of illustration specific embodiments in which the invention may be practiced. It is to be understood that other embodiments may be utilized and structural changes may be made without departing from the scope of the present invention.

Figure 1:
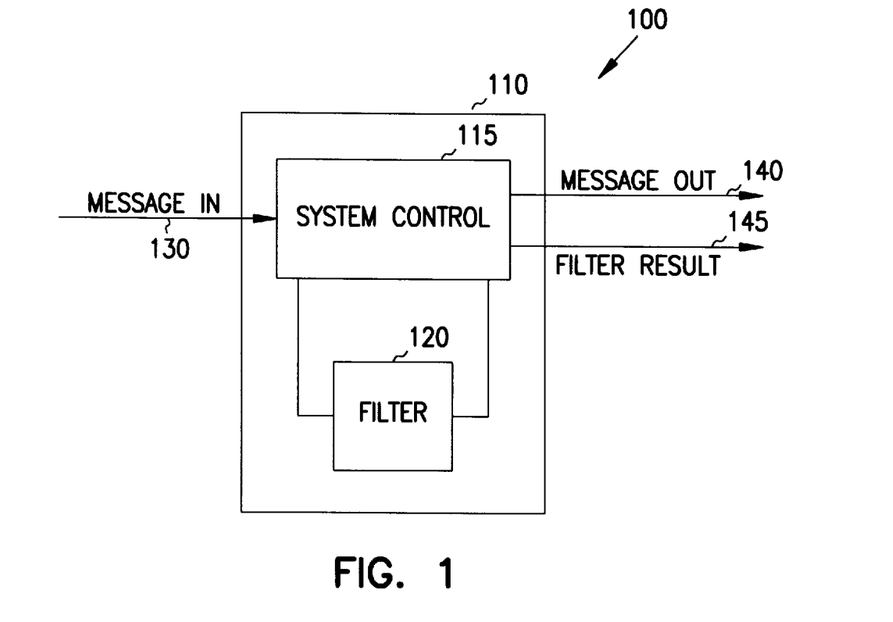
FIG. 1 is a representation of an electronic messaging system having a message filter.

One embodiment of the binary filter described by the present invention, shown in FIG. 1, basically comprises a binary engine 120 which can be interfaced with an electronic messaging system 110. The binary filter 120 is a binary engine which may be interfaced with any one of a variety of messaging systems 110. For example, input message 130 is received by the messaging system 110 from an external network 140. System control 115 passes the message to the binary filter 120 to determine whether a message is normal text (natural language) or something else. After the filter 120 has analyzed the message the results are passed back to system control 115, which then makes message processing decisions based on the filter results. The filter 120 does not modify nor amend the message in any way, instead providing filter results 145 which messaging system 110 can treat as associated with but independent from the message output 140.

Figure 2:
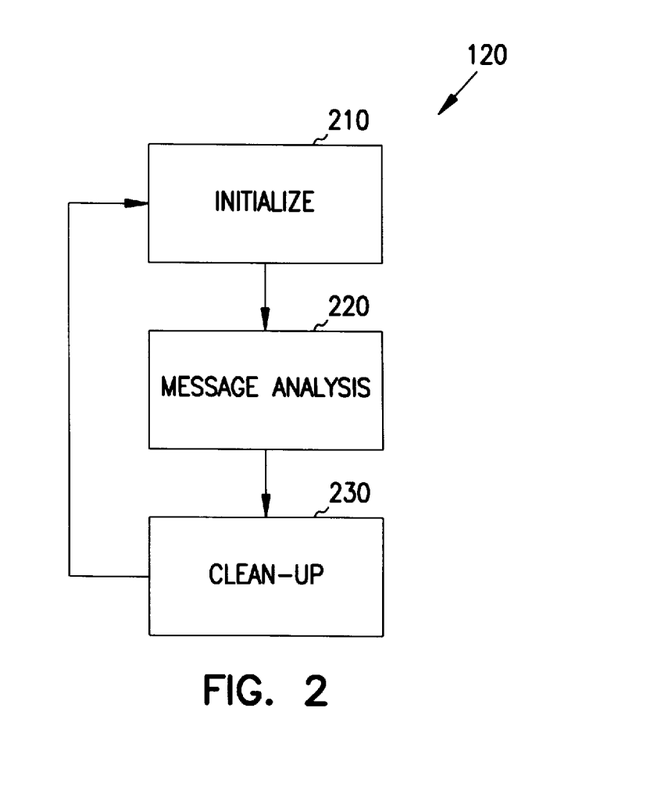
FIG. 2 is a representation of the basic elements of a binary filter.
Figure 3:
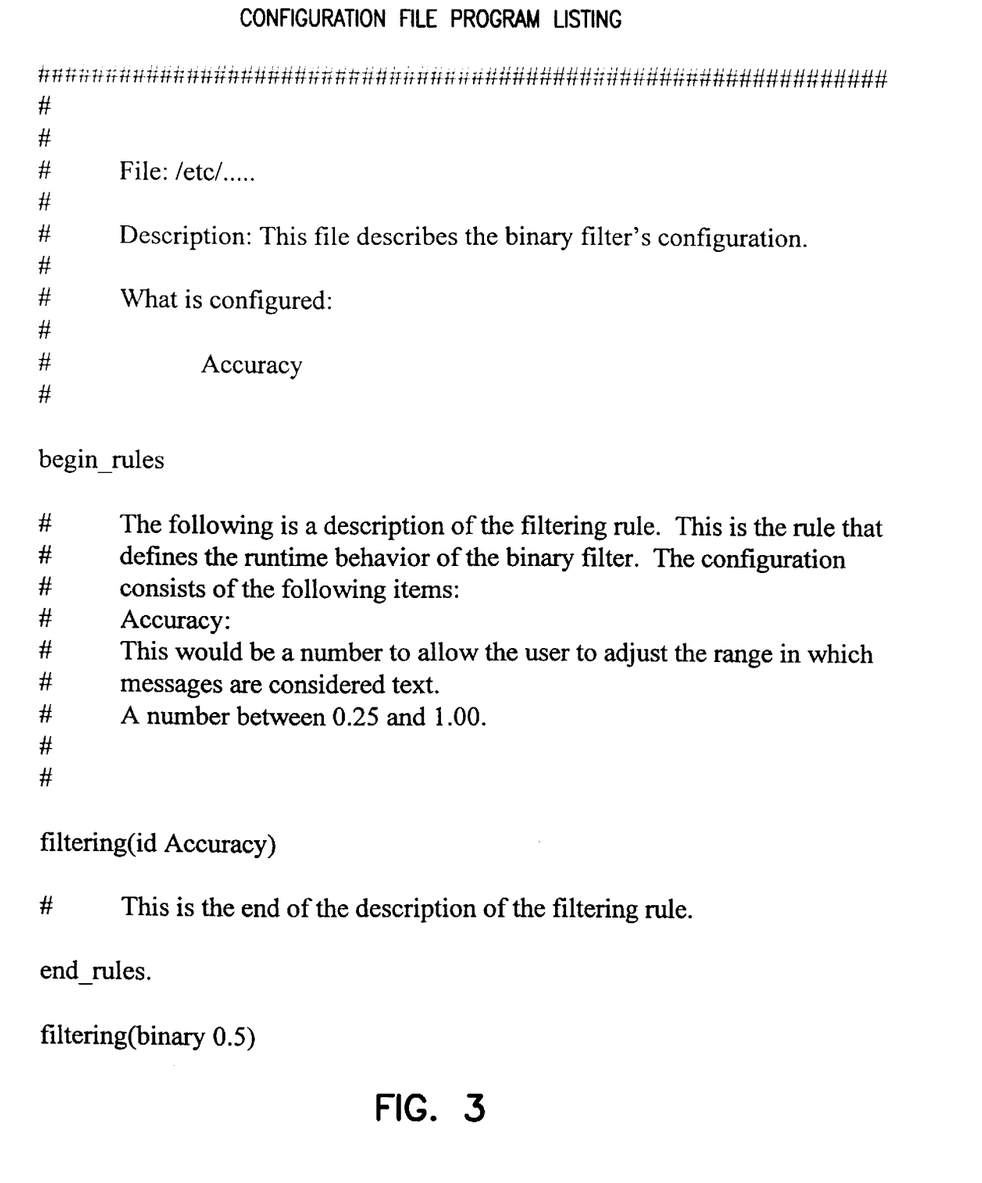
FIG. 3 is a program listing of the structure of a configuration file according to one embodiment of the present invention.

According to one embodiment, shown in FIG. 2, the binary filter 120 is composed of three parts which all exist within the same process. Each part provides a distinct set of functions. The Filter Initialization Module 210 provides the initialization functions, including loading a configuration file which contains the settings for the binary filter. FIG. 3 shows the contents of one embodiment of the configuration file, including an Accuracy setting used to establish the accuracy of the filter.

When binary filter 120 is interfaced with a system or application (for example, the messaging system referenced in FIG. 1 and accompanying text), the system or application must have read permissions on the directory or directories containing the binary filter files, and read permission on the configuration file as well. Because the binary filter does not modify its initial state, it only needs to be initialized at startup.

Message Analysis module 220 provides the filtering functions. These functions include receiving the message, applying the filtering algorithm to the message, and preparing and transmitting the filter results. Clean-up module 230 of the binary filter 120 comprises functions which clean up and shut down the binary filter 120 when it ceases processing. These functions ensure that the system within which the binary filter 120 is executing is left in a good state.

Figure 4:
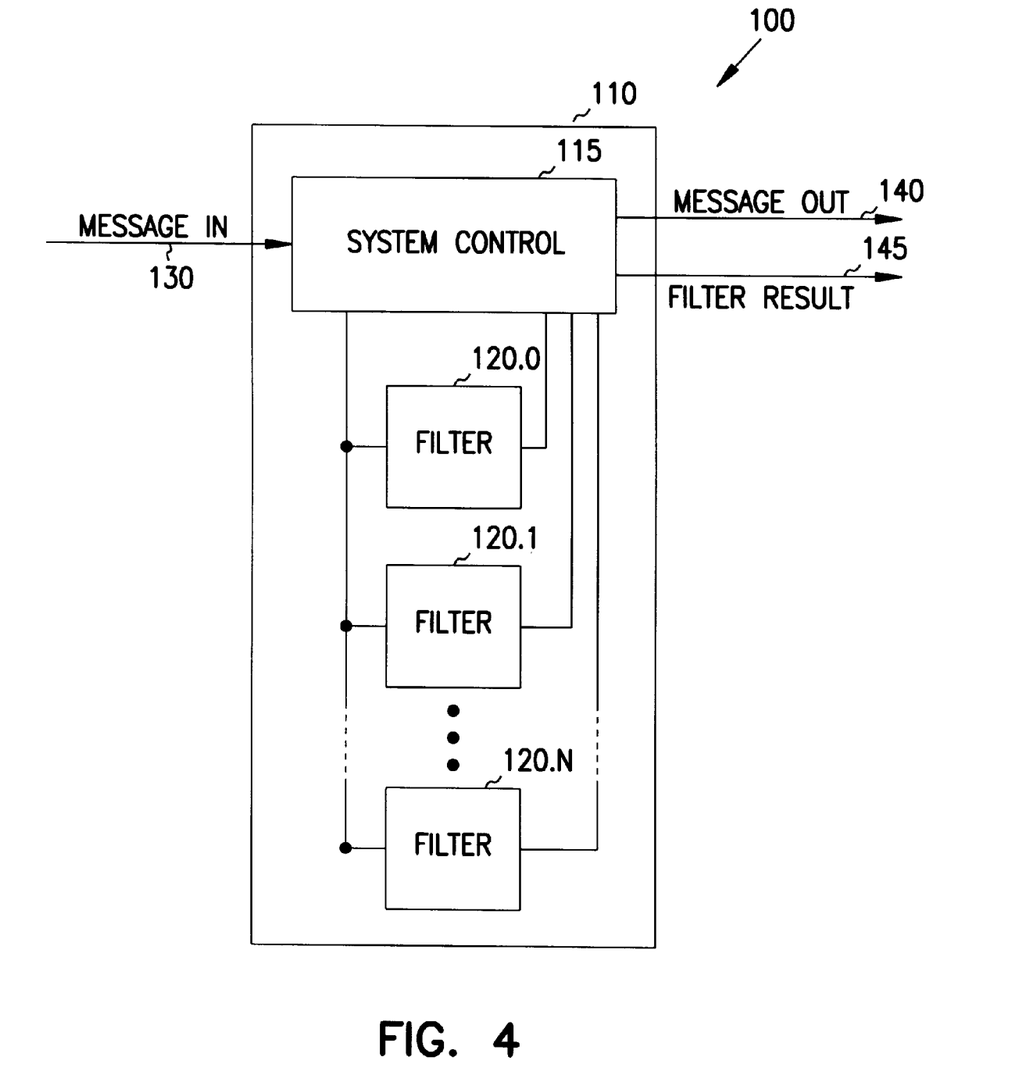
FIG. 4 is a representation of the electronic messaging system shown in FIG. 1 having multiple message filters.

In another embodiment, represented in FIG. 4, messaging system 120 allows for the creation of one or more "flows" or message paths. System control 115 processes individual messages on different flows based on some identifying criteria such as to- or from-address. A different configuration file can be established for each flow, giving in effect a different filter 120.0–120.n for each flow. Filter results are individually returned to system control 115, providing flexibility in security/filtering policy implementation.

Figure 5:
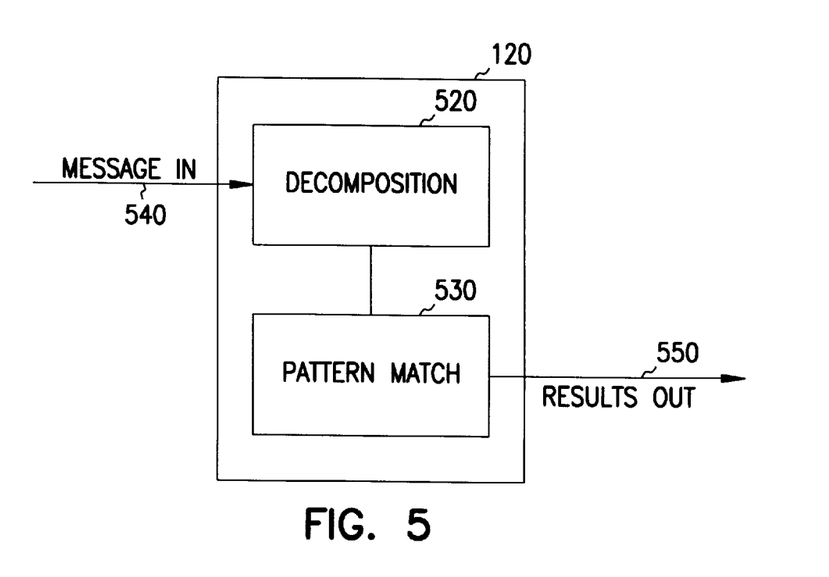
FIG. 5 is a representation of a message filter according to one embodiment of the present invention.

As shown in FIG. 5, filter 120 comprises a decomposition element 520 and a pattern matching element 530. A message is received 540 from the messaging system. The decomposition element 520 decomposes the message into a set of components, which are then analyzed through the pattern matching element 530. The results of the pattern match (generally either an affirmative or a negative indicator) are transmitted 550 to the messaging system to be used in conjunction with decisions regarding message processing by the messaging system. The decomposition and pattern matching processing is discussed in greater detail below.

In one embodiment, the binary filter implements a pattern-recognition method to determine if an electronic message comprises normal text. The binary filter of this embodiment recognizes as normal text messages written in a natural human language such as English. Other natural languages are also generally recognized by the binary filter as normal text messages. Natural languages have specific statistical properties which are significantly different from (and difficult to impart to) other types of messages. As an example, messages of the following types are among those the binary filter will flag as non-text: MIME attachments, uuencoded files, btoa encoded files, binary-hex encoded files, binary files, encrypted mail, and shar files. It is to be recognized that these examples are offered for illustration purposes only and are not intended to be exclusive or limiting. Normal text mail with small binary sections such as "X-Face" lines or the attachment that Microsoft Mail puts on every message will generally not be flagged as being non-text by the filter.

Figure 6:
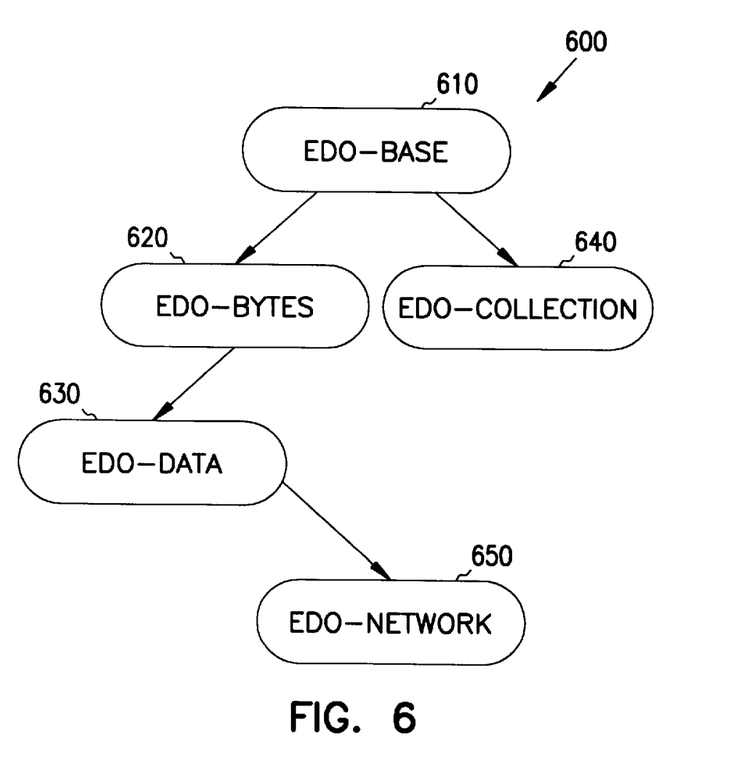
FIG. 6 is a representation of an Extensible Data Object.

The binary filter performs a pattern match analysis on the data found within the message data structure. In one embodiment an Extensible Data Object (EDO) data structure is employed. The details of the EDO data structure is described in "System and Method of Mail Filtering", U.S. patent application Ser. No. 08/715,336, filed herewith, which data structure description is hereby incorporated by reference. FIG. 6 is a representation of the set of data types which comprise an EDO 600 data structure used by one embodiment of the present invention. The EDO base 610 provides the common interface to all of the EDO data structures. The EDO bytes 620 is a dynamically allocated array of bytes, the contents of which may be modified by objects such as the binary filter 120 of the present invention. The EDO data 630 is a byte bucket with a collection of EDOs which may be search and added to by objects such as filters. This is a mechanism to allow annotation and additional data to be added to the original message. The EDO network 650 is a data EDO with some additional context describing the data which is being operated on by the object. It includes the source and destination address of the data. The EDO collection 640 is derived from the EDO base, to which it adds pointers to functions for adding EDOs to the collection, finding EDOs in the collection, or removing EDOs from the collection. An EDO collection 640 is used as a field in the EDO data 630 and EDO network 650 data types.

The binary filter expects the entire content of the message to be contained within the Bytes 610 section of the EDO 600. The actual binary filter is called once for each EDO Bytes section 610. The entire contents of the Bytes section 610 is treated as a single message by the binary filter. This approach cannot guarantee that any specific e-mail message will be caught, but will, however, catch the widest variety of violators with a single algorithm. This generalized approach improves over conventional systems in other aspects as well. Since the binary filter approach is not format-specific it is much more difficult to break. Format-specific systems follow the rules of the format and thus it is much easier to avoid detection by imitating the format. In addition, file formats not previously encountered are still likely to be detected in a binary filter system.

Conventional systems require a new filter be built each time a new format is encountered, and until the new filter is created the new format is not caught. Misclassification by the binary filter of any one message in either direction is a possibility. One method by which this effect can be minimized is pre-filtering messages based on size. Shorter messages are more likely to be misclassified due to the limited amount of data to analyze, and the majority of encoded or binary data files are relatively large. By only passing messages larger than a specified size the risk of misclassifying a non-text message as text is not appreciably increased, while the risk of misclassifying a short text message as non-text is greatly reduced.

Figure 7:
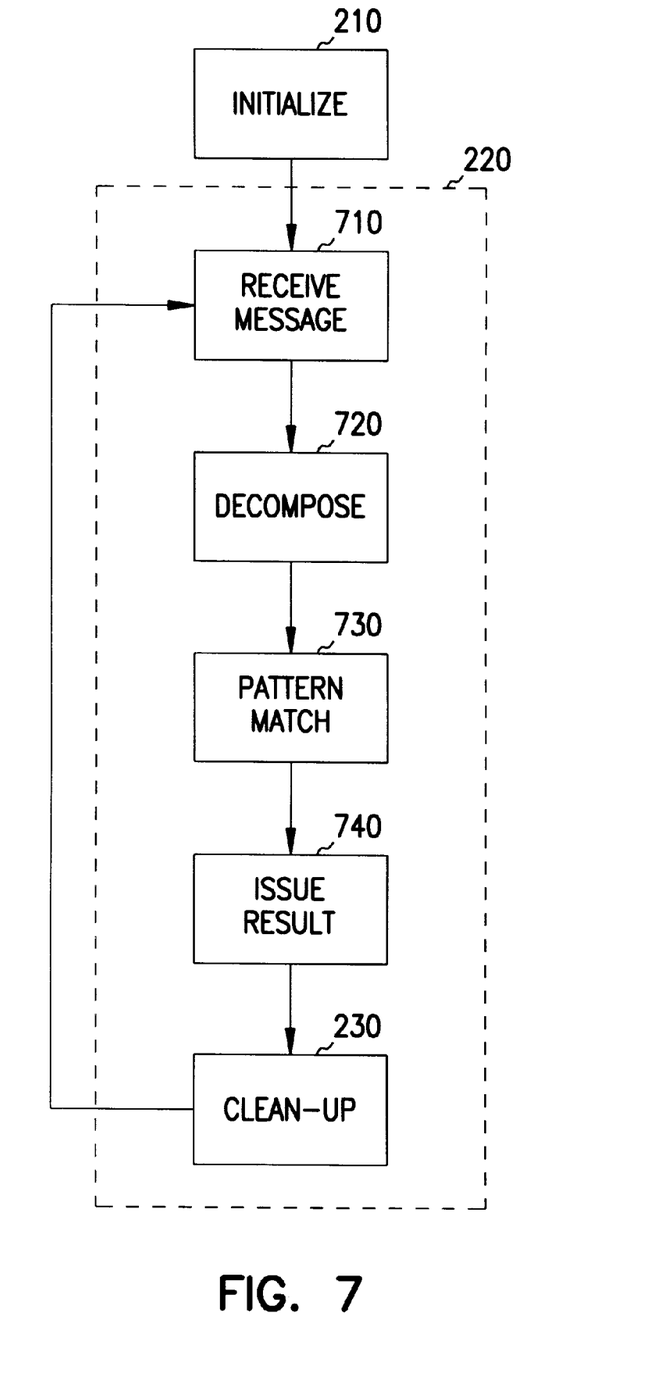
FIG. 7 is a more detailed representation of one embodiment of the binary filter shown in FIG. 2, showing the modules comprising the filter element shown in FIG. 2.

FIG. 7 shows a more detailed representation of the processing steps performed by one embodiment of binary filter 120. At the first process step 710 within Message Analysis module 220, the filter receives the message from the messaging system. At the next process step 720, Message Analysis module 220 identifies the components of the message, breaking the message into quantifiable pieces. There are a number of methods, statistical, analytical, empirical, or some combination, for accomplishing the decomposition step.

Figure 8:
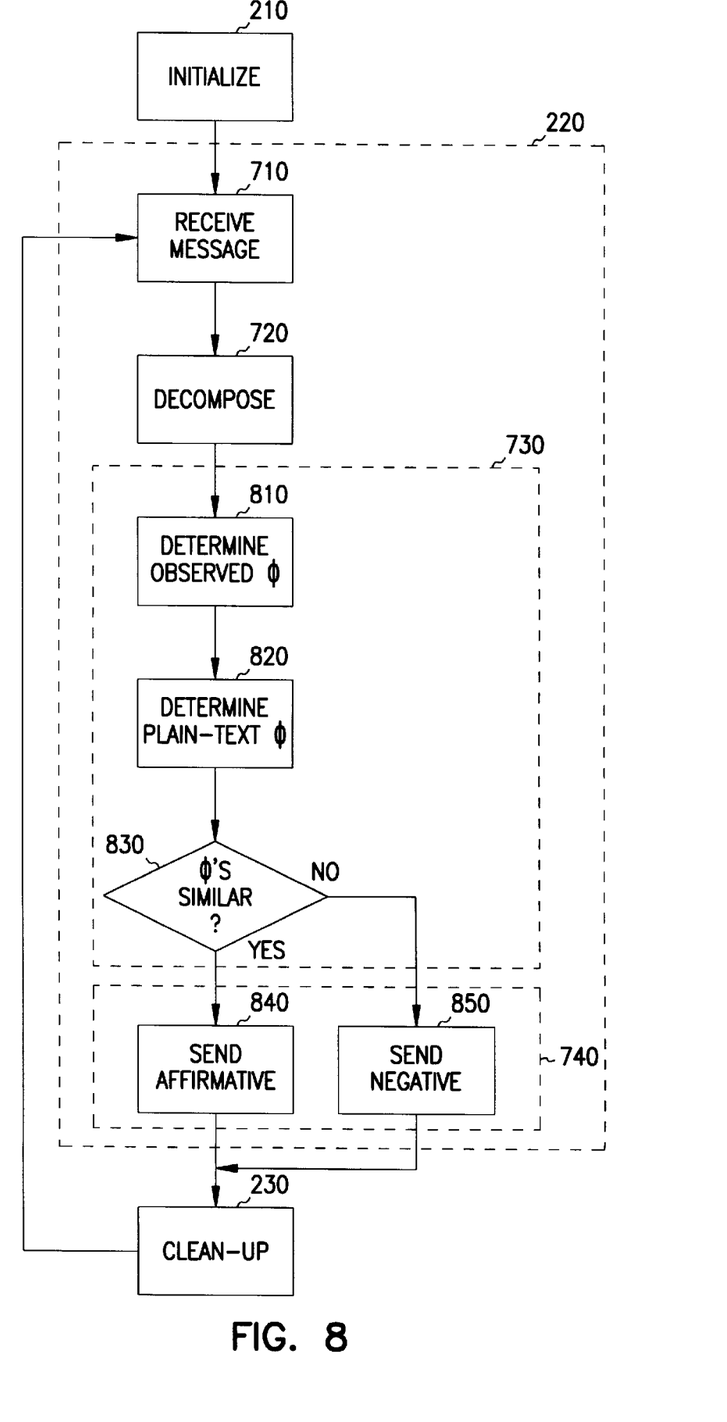
FIG. 8 is a further expanded representation of the binary filter shown in FIG. 7, show the process steps comprising the pattern analysis module.

FIG. 8 shows a more detailed view of the pattern matching 730 and issue result 740 steps performed by binary filter 120. According to one embodiment of the present invention, the filter uses N-gram frequency methods to decompose a message 720 in order to determine the distributions of patterns within the message. An N-gram is a group of adjacent characters, where N is the number of characters in each group. As an example, the phrase "It was a dark an stormy night" can be broken into the following set of N-gram components:

TABLE 1

Heuristics Examples

|  | ratio of lowercase to uppercase | ratio of punctuation to total valid characters |
|---|---|---|
| PGP | 1.00–2.02 | 0.03–0.18 |
| binary | 0.82–21.85 | 0.14–0.55 |
| BTOA | 0.73–9.75 | 0.14–1.54 |
| MIME | 0.26–1.33 | 0.008–0.07 |
| uuencoded | 0.00009–0.04705 | 1.12–6.60 |
| scripts | 0.95–177 | 0.05–0.64 |
| text | 3.26–30.08 | 0.28–0.258 |

It can be seen that the heuristics in Table 1 can be used individually or together to distinguish between different message formats. For example, a combination of the first and second ratios could be used to distinguish between MIME and text, while a different combination of the two ratios could be used to distinguish between uuencoded and text.

Another decomposition technique is decomposing the message into a list of words based upon detection of spaces and punctuation in the message. Those skilled in the art will recognize that any message decomposition technique may be employed without exceeding the spirit or scope of the present invention.

| 1-grams | i | t | w | a | s | d | r | k | n | o | m | y | g | h |
|---|---|---|---|---|---|---|---|---|---|---|---|---|---|---|
| frequency | 2 | 3 | 1 | 4 | 2 | 2 | 2 | 1 | 2 | 1 | 1 | 1 | 1 | 1 |
| c * (c-1) | 2 | 6 | 0 | 12 | 2 | 2 | 2 | 0 | 2 | 0 | 0 | 0 | 0 | 0 |

| 2-grams | it | t_ | _w | wa | as | s_ | _a | a_ | _d | da | ar | rk | k_ | an |
|---|---|---|---|---|---|---|---|---|---|---|---|---|---|---|
| frequency | 1 | 1 | 1 | 1 | 1 | 1 | 2 | 1 | 1 | 1 | 1 | 1 | 1 | 1 |
| c * (c-1) | 0 | 0 | 0 | 0 | 0 | 0 | 1 | 0 | 0 | 0 | 0 | 0 | 0 | 0 |

| 2-grams | nd | d_ | _s | st | to | or | rm | my | y_ | _n | ni | ig | gh | ht |
|---|---|---|---|---|---|---|---|---|---|---|---|---|---|---|
| frequency | 1 | 1 | 1 | 1 | 1 | 1 | 1 | 1 | 1 | 1 | 1 | 1 | 1 | 1 |
| c * (c-1) | 0 | 0 | 0 | 0 | 0 | 0 | 0 | 0 | 0 | 0 | 0 | 0 | 0 | 0 |

| 3-grams | it_ | t_w | _wa | was | as_ | s_a | _a_ | a_d | _da | dar |
|---|---|---|---|---|---|---|---|---|---|---|
| frequency | 1 | 1 | 1 | 1 | 1 | 1 | 1 | 1 | 1 | 1 |
| c * (c-4) | 0 | 0 | 0 | 0 | 0 | 0 | 0 | 0 | 0 | 0 |

| 3-grams | ark | rk_ | k_a | _an | and | nd_ | d_s | _st | sto | tor |
|---|---|---|---|---|---|---|---|---|---|---|
| frequency | 1 | 1 | 1 | 1 | 1 | 1 | 1 | 1 | 1 | 1 |
| c * (c-1) | 0 | 0 | 0 | 0 | 0 | 0 | 0 | 0 | 0 | 0 |

| 3-grams | orm | rmy | my_ | y_n | _ni | nig | igh | ght |  |  |
|---|---|---|---|---|---|---|---|---|---|---|
| frequency | 1 | 1 | 1 | 1 | 1 | 1 | 1 | 1 |  |  |
| c * (c-1) | 0 | 0 | 0 | 0 | 0 | 0 | 0 | 0 | 0 |  |

The frequency field indicates the number of times that N-gram occurs in the message, and the c*(c+1) field is a value, used in pattern analysis, representing the count (or frequency) of the N-gram times the count minus 1. The patterns described by repeating groups can be then used to analyze the message from which the N-grams were generated. As a side note, it can be seen from the examples that larger N-grams are ineffective as messages become shorter.

In another embodiment, N-gram frequency methods are coupled with heuristics to more accurately identify natural text. Examples of two heuristics which could be employed, and how characteristic they are of various message formats, are shown in Table 1 below. In addition, we have found that a count of the number of null characters in a message can be used to distinguish text from certain binary formats.

At the third process step 430, Message Analysis module 220 applies pattern recognition methods to determine if the message falls within parameters expected in a natural language. In one embodiment of the present invention a phi-test is employed. Those skilled in the art, however, will recognize that other pattern recognition techniques may be substituted without exceeding the spirit and scope of the present invention. One with a strong statistical background may employ Bazeries classifiers rather than the phi-test. Other might employ N-grams with neural networks. Another possible option is to incorporate an existing text-analysis package such as the National Security Agency's Acquaintance. A more simple approach, such as could be used with the word list generated above, may be to simply compare the character strings in the message to the words contained in a dictionary. Any of these techniques, or others not described here, may be incorporated in the binary filter of the present invention.

The phi-test was initially devised in 1935 by Dr. Solomon Kullback as a means of decrypting encoded text. The intended purpose of the test is to use the frequency count of characters or digraphs (groups of characters) in a particular message to determine whether the encipherment is monalphabetic or polyalphabetic. To use the phi-test, the cryptanalyst first determines the polyalphabetic expected phi and the monalphabetic expected phi. A frequency count is then performed on the cryptogram (encrypted message) and the observed phi calculated. Whichever expected phi the observed phi is closer to indicates the encipherment pattern. In the field of encoded text, the phi-test is used to guide toward further decrypting steps.

In one embodiment of the present invention, the phi-test is used in a novel approach to perform pattern recognition. Rather than determining whether an encoded message is mon- or polyalphabetic, the test is employed to determine whether a message is language-based or random text. Frequency, as used in reference to the phi-test, means the number of times a given n-gram appears in the text. The filter first determines the expected frequency of plain text (kappa sub p or '$k_p$') and then analyzes a message to determine if it is close to the expected value, according to the following formula:

$$k_p = \sum \left( \frac{count_i}{totalngrams} \right)^2$$

where "n" is the N-gram size (e.g. n=2 for a 2-gram, 3 for a 3-gram). As an example, common values used with the English alphabet of 26 characters are, when n=1, $k_p$=0.066. When n=2, $k_p$=0.0069. Other natural languages have similar phi values. In Russia's thirty-letter Cyrillic alphabet, when n=1, $k_p$=0.0529, while for French $k_p$=0.0778, for German $k_p$=0.0762, for Italian $k_p$=0.0738, and for Spanish $k_p$=0.0775. Note that $k_p$ is in the range of 0.05 to 0.08 for a number of natural languages. Although the filter does not actually use any of these actual numbers, since we expect the numbers to be very close to each other the filter can reasonably accurately identify a wide range of natural languages.

In one embodiment of the present invention, the phi test is implemented as follows. The message is read, and as part of decomposition step 720 (FIG. 8) the frequency of each character (or digram, trigram, etc.) is recorded. The observed phi 810 is calculated by summing the product of the count of each N-gram and the count of each N-gram minus 1.

$$\phi_{observed} = \Sigma countngram_i \times (countngram_i - 1)$$

Using the example message used during the N-gram discussion, the $\phi_{observed}$ for 1-gram analysis is 172, for 2-gram is 1, and for 3-gram is 0.

The plain-text phi is then calculated 820 by multiplying together the total number of N-grams found in the message, the total number minus one, and the $k_p$.

$$\phi_{plaintext} = totalngrams \times (totalngrams - 1) \times k_p$$

Once more, the example from above will be used. The $k_p$ for English is used since the message is in English. Thus the $\phi_{plain\_text}$ for 1-gram analysis is 14 * 13 * 0.066 or 12.012, for both 2-gram and 3-gram is 28 * 27 * 0.066 or 49.896.

In one embodiment, pattern analysis consists of dividing the observed phi by the plain-text phi 830. The result for the 1-gram example is 14.3, for the 2-gram example is 0.02, and for the 3-gram example is 0. The closer the result is to one the better the probability that the message is text. As can be seen from the results of the example, a small sample set, does not provide a reliable result. In testing one implementation of the system of the present invention with a sample set of 337, it was found that 3-gram decomposition provided the best combination of speed and accuracy. With a message analysis of the sample set employing a 2-gram decomposition technique, normal text messages were classified correctly 100% of the time, but binary (non-text) messages were classified correctly only 52% of the time. When 3-gram decomposition was employed, normal text messages were still correctly classified 95% of the time, and the number of correctly classified binary messages went up to 88%. Subsequent tests with larger sample sets (800+) have produced similar results. When the three heuristics described above are used in combination with an N-gram based technique, the resulting determination of message type is more accurate. As an example, when an N of 3 is used, the percentage of normal text messages classified correctly is still 95%, but the percentage of non-text messages classified correctly jumps to 99%. These numbers may change as we gather more samples, but expectations are that with a combination of decomposition/analysis filtering and heuristic filtering it is possible to correctly classify text and binary files to a high degree of accuracy.

Figure 9:
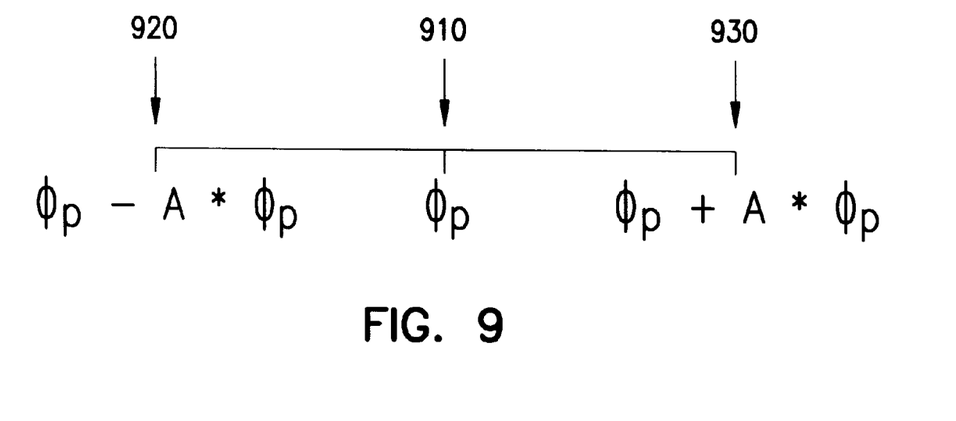
FIG. 9 is a graphic representation of the Accuracy range setting.
Figure 10:
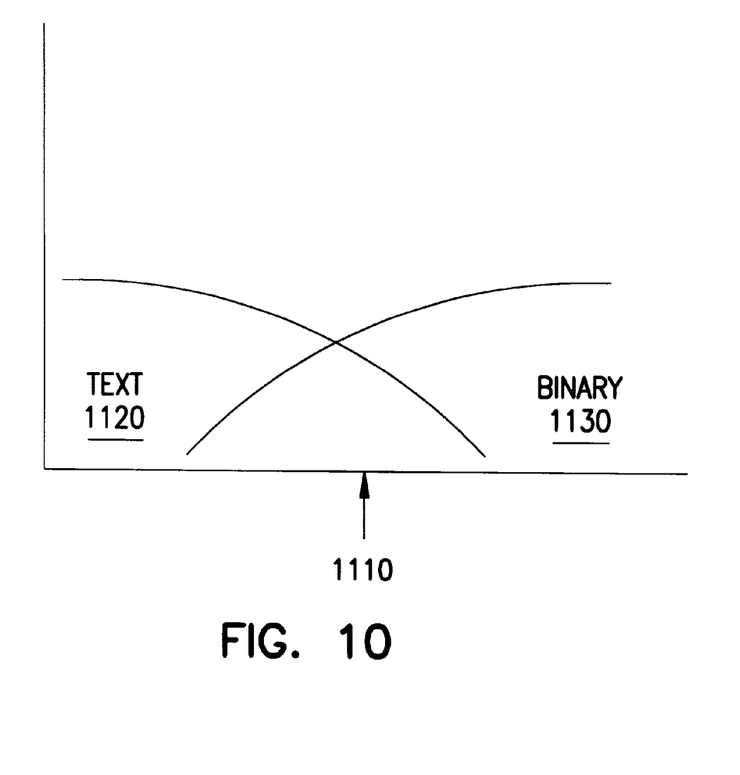
FIG. 10 is a graphic representation of how the content of normal text and binary files correlate.

According to another embodiment of the present invention, the classification of text versus binary may be made based solely on whether the observed φ falls within the accuracy setting of the plain text φ. The system administrator can adjust the accuracy (how close the two values have to be) by modifying the accuracy value in the filter configuration file. In such an embodiment the configuration settings ("Accuracy") establish the accuracy of the filter. FIG. 9 is a graphic representation of how the Accuracy setting works. Accuracy is essentially a balancing between accepting normal text and rejecting binary messages. The plain text φ 910 is in the middle of the scale. The Accuracy value establishes the range to either side of plain text φ 910 within which messages will be identified as normal text, using a formula either adding 930 or subtracting 920 the Accuracy value. For example, if the calculated φ is 1000 and the Accuracy is set to 0.5, then any message with a $\phi_{observed}$ between 500 and 1500 will be classified as normal text. Anything outside that range will be classified as binary. It can be seen how increasing or decreasing the Accuracy affects the range of messages classified as normal text. FIG. 10 is a graphic representation of how the content of normal text and binary files correlate. It can be seen from the graph that it is the overlap area which creates the challenge. Having an adjustable Accuracy value allows the administrator to more closely match the message classification process to their particular security policy. Moving the arrow 1110 (in effect the Accuracy window) to the left stops both more binary and more text, while moving it to the right allows more of both formats. Statistics are available to help identify where to set the Accuracy value. In practice a number between 0.25 and 0.8 can be used to establish the range in which messages are considered text.

As an example, suppose a network administrator wants almost no binaries to come in and they feel this is more important than allowing 95% of text to go through. To achieve this, the network administrator should select an Accuracy of 0.4, which tests have shown to correctly classify 98.6% of all binary messages and 85.5% of all normal text messages. Under this configuration, the filter would catch more binary messages but would mis-identify more text messages. On the other hand, suppose the administrator wants to stop binaries but they do not want to stop any text. To achieve this, the network administrator should select an Accuracy of 0.8, which correctly classifies 95% of all normal text messages but only 88% of all binary messages. The filter would then let more binaries through, but would also let almost all the text through. The above examples are for illustrative purposes only. The values are based on sample data sets which represent but are not necessarily identical to real world results.

In one embodiment, after the pattern matching processing 730 is complete, Message Analysis module 220 formulates an affirmative 840 or negative 850 result message at process block 740 which is sent to the messaging system employing the filter. In such an embodiment Message Analysis module 220 provides only information on the message to the messaging system, and does not modify or amend the message in any way. It is left to the messaging system, now that it has been informed of whether the message is normal text or not, to decide what to do with the message. In another embodiment, Message Analysis module 220 can take steps to discard the message without involving the messaging system.

Activation of the functions of the binary filter 120 is controlled by system 110 within which binary filter 120 is interfaced. In one embodiment, binary filter 120 is interfaced with a mail framework such as that described in the "System and Method of Mail Filtering" patent disclosure mentioned above. In one such embodiment binary filter 120 can be used, for example, to ensure that mail sent to external addresses is encrypted by flagging all normal text messages. Binary filter 120 may also be employed to prevent all messages except plain text from entering the system, in an effort to minimize exposure to malicious activity. The calling system (in this example the mail framework) drives binary filter 120, causing it to make the proper function calls at appropriate times. The interface with the service for which the binary filtering is being performed is provided by the calling system 110. In one implementation, binary filter 120 and calling system 110 coexist within the same process.

It is not possible to strictly specify what will or will not be caught by the filter. To properly set the Accuracy value in the configuration file a large set of test messages must be generated, tested and categorized as binary and non-binary messages. As experience is gathered the Accuracy values can be refined. Additionally, as experience is obtained it is expected that configuration file accuracy values can be adjusted to include accuracy requirements that are functions of file size and/or other characteristics.

Accuracy would ideally expressed relative to the total set of message traffic being exchanged on the Internet. Since this is impossible to test, the test team must work with development to build up a library that includes a realistic distribution of messages that also includes representative samples of many different forms of encoding binary data.

Typically, it will be considered worse to mis-recognize a normal text message as a binary than to mis-recognize a binary as a normal text message. Therefore, in most embodiments, the N-gram value N and the phi-test value should be set so that at least 90% of binaries are correctly classified and at least 95% of normal text messages correctly classified. However, this is ultimately a decision made by each site in light of its security policy. The system of the invention provides a number of site-modifiable parameters, allowing each site to structure filter behavior based on their particular requirements.

An object external to the filter may be implemented to route messages with a length less than the size threshold established by the system administrator may be employed in one embodiment to help improve accuracy. Under a certain size, the filter is less reliable. The external object can be linked into the filter pipe before the binary filter if the user wishes to use this configuration.

As discussed above, the best results were achieved by combining an N-gram decomposition technique with an N of 3 with heuristic processing as well. In one embodiment the following heuristics were applied to help identify certain message types which are more difficult to distinguish from plain text.

1) If the ration of lowercase to uppercase is under a certain constant, the message will be considered binary. For uuencoded, MIME and PGP files this number was found to be around 1.0. For normal text this number was usually around 3.

2) If the ration of punctuation to the total number of valid characters is above a certain constant, the message will be considered binary. For normal text and other message types this number was usually close to 0. For uuencoded messages this number was found to be higher, generally above 1.0.

3) If the number of null characters is above a certain number, the message will be considered binary. This eliminates raw binaries and also any binaries that may have been enclosed in a group of files that were compressed.

Such an approach was very successful at classifying a broad range of natural language and binary messages. In one test 95% of the text messages were classified correctly as text messages while over 99% of the binary messages were correctly classified as binary.

Although the present invention has been described with reference to the preferred embodiments, those skilled in the art will recognize that changes may be made in form and detail without departing from the spirit and scope of the invention.

What is claimed is:

1. A method of detecting if an electronic message is in a particular format, comprising the steps of:

decomposing the message into a set of components according to a predetermined component size; and applying pattern recognition logic to the set of components as a function of the predetermined component size to determine if the electronic message is predominately natural language text, wherein applying pattern recognition logic includes:

determining an observed phi of the electronic message;

determining a plain-text phi of the electronic message as a function of the component size; and comparing the observed phi to the plain-text phi to determine if the electronic message includes data in the particular format.

2. The method of claim 1, wherein the step of decomposing the message comprises the step of breaking the message into words.

3. The method of claim 1, wherein the step of decomposing the message comprises the step of breaking the message into N-grams, wherein N equals the component size.

4. The method of claim 3, wherein N=3.

5. The method of claim 1, wherein the step of decomposing the message includes breaking the message into N-grams, wherein N equals the component size and wherein the step of applying pattern recognition logic comprises:

analyzing the frequency of the N-grams with N-gram analysis;

applying a heuristic capable of distinguishing between natural language text and another message format; and determining, based on the N-gram analysis and application of the heuristic, whether the electronic message is likely to be natural language text.

6. The method of claim 5, wherein the heuristic counts the number of null characters in the electronic message.

7. The method of claim 5, wherein the heuristic calculates a ratio of lowercase to uppercase characters in the electronic message.

8. The method of claim 5, wherein the heuristic calculates a ratio of punctuation to total valid characters in the electronic message.

9. A method of filtering an electronic message to detect a particular format, comprising the steps of:

decomposing the electronic message into a set of components according to a predetermined component size;

determining an observed phi of the electronic message;

determining a plain-text phi of the electronic message as a function of the component size; and comparing the observed phi to the plain-text phi to determine if the electronic message includes data in the particular format.

10. The method of claim 9, wherein the step of decomposing the message comprises the step of breaking the message into words.

11. The method of claim 9, wherein the step of decomposing the message comprises the step of breaking the message into N-grams, wherein N equals the component size.

12. The method of claim 11, wherein the step of applying pattern recognition logic comprises:

analyzing the frequency of the N-grams with N-gram analysis;

applying a heuristic capable of distinguishing between natural language text and another message format; and determining, based on the N-gram analysis and application of the heuristic, whether the electronic message is likely to be natural language text.

13. A method of filtering an electronic message, comprising the steps:

receiving an electronic message from an electronic mail structure;

decomposing the message into a set of components according to a predetermined component size;

applying pattern recognition logic to the set of components as a function of the predetermined component size to determine if the electronic message is predominately natural language text, wherein applying pattern recognition logic includes:

determining an observed phi of the electronic message;

determining a plain-text phi of the electronic message as a function of the component size; and comparing the observed phi to the plain-text phi to determine if the electronic message includes data in the particular format; and issuing an affirmative response to the electronic mail structure if the electronic message is predominately natural language text.

14. The method of claim 13, wherein the step of decomposing the message comprises breaking the message into N-grams, wherein N equals the component size.

15. The method of claim 14, wherein N=3.

16. The method of claim 13, wherein the step of decomposing the message comprises breaking the message into N-grams, wherein N equals the component size.

17. The method of claim 16, wherein the step of applying pattern recognition logic comprises:

analyzing the frequency of the N-grams with N-gram analysis;

applying a heuristic capable of distinguishing between natural language text and another message format; and determining, based on the N-gram analysis and application of the heuristic, whether the electronic message is likely to be natural language text.

18. A method of filtering an electronic message to detect a particular format, comprising the steps:

receiving an electronic message from an electronic mail structure;

decomposing the message into a set of components according to a predetermined component size;

determining an observed phi of the electronic message;

determining a plain-text phi of the electronic message as a function of the component size; and comparing the observed phi to the plain-text phi to determine if the electronic message includes data in the particular format.

19. An electronic message filter, comprising:

a filter initialization module;

a message analysis module, wherein the message analysis module includes:

decomposition means for decomposing electronic messages into a set of components according to a predetermined component size; and pattern recognition means for determining if the set of components has characteristics expected in an electronic message which is predominately natural language text, wherein the pattern recognition means determines an observed phi of the electronic message and compares the observed phi to a plain-text phi of the electronic message to determine if the electronic message includes data in the particular format, wherein the plain-text phi is determined as a function of the predetermined component size; and a clean-up module;

wherein the message analysis module determines if the electronic messages should be passed based on whether the electronic messages are predominately natural language text.

20. The electronic message filter of claim 19, wherein the filter initialization module comprises storage means for storing execution parameters for the message analysis module.

21. The electronic message filter of claim 19, wherein the decomposition means is an N-gram decomposition module, wherein N equals the component size.

22. The electronic message filter of claim 19, wherein the pattern recognition means includes means for applying a set of rules based on a heuristic associated with the particular format.

23. The electronic message filter of claim 19, wherein the pattern recognition means includes means for applying a phi-test to the set of components as a function of the component size.

24. A computer program product, comprising:

a computer usable medium having a computer readable code means embodied therein for causing electronic messages to be analyzed as to whether the contents of each electronic message comprises a natural language, the computer readable program code means in said computer program product comprising:

computer readable program code means for causing a computer to read a first electronic message;

computer readable program code means for causing a computer to decompose the first electronic message into components according to a predetermined component size; and computer readable program code means for causing a computer to perform a pattern analysis of the components to identify whether the first electronic message is predominately natural language text, wherein the program code means causes the computer to perform a pattern analysis of the components in order to determine an observed phi of the electronic message and compare the observed phi to a plain-text phi of the electronic message to determine if the electronic message includes data in the particular format, wherein the plain-text phi is determined as a function of the predetermined component size.

25. The computer program product of claim 24, wherein the program code for causing a computer to decompose the first electronic message includes program code for breaking the message into N-grams, wherein N equals the component size and wherein the program code for causing a computer to perform a pattern analysis includes:

program code for analyzing the frequency of the N-grams with N-gram analysis;

program code for applying a heuristic capable of distinguishing between natural language text and another message format; and program code for determining, based on the N-gram analysis and application of the heuristic, whether the electronic message is likely to be natural language text.

* * * * *